(12) United States Patent
Suzuki

(10) Patent No.: US 7,006,122 B2
(45) Date of Patent: Feb. 28, 2006

(54) TELEVISION CONFERENCE SYSTEM

(75) Inventor: Makoto Suzuki, Nagoya (JP)

(73) Assignee: Brother Kogyo Kaushiki Kaisha, Nagoya (JP)

(*) Notice: Subject to any disclaimer, the term of this patent is extended or adjusted under 35 U.S.C. 154(b) by 36 days.

(21) Appl. No.: 10/875,580

(22) Filed: Jun. 25, 2004

(65) Prior Publication Data

US 2004/0264390 A1 Dec. 30, 2004

(30) Foreign Application Priority Data

Jun. 27, 2003 (JP) .............................. 2003-184323

(51) Int. Cl.
*H04N 7/14* (2006.01)

(52) U.S. Cl. ................. 348/14.08; 348/14.07
(58) Field of Classification Search ... 348/14.01–14.16
See application file for complete search history.

(56) References Cited

U.S. PATENT DOCUMENTS 6,369,846 B1 * 4/2002 Katsumi .................. 348/14.01
6,473,114 B1 * 10/2002 Strubbe .................... 348/14.07

\* cited by examiner

*Primary Examiner*—Wing F. Chan
(74) *Attorney, Agent, or Firm*—Oliff & Berridge, PLC

(57) ABSTRACT

A television conference system enables a plurality of participants to communicate with each other using terminal devices connected to a controller via information transfer system. Each of the terminal devices are provided with a display for displaying a participant making a remark. The television conference system includes a speech quantity information obtaining system that obtains speech quantity information related to quantity of speech of each of the plurality of participants during a conference, a terminal identifying system that identifies a terminal corresponding to a participant currently making a remark, and an image switching system that switches images displayed on the displays of the plurality of terminal devices from a previous participant to the participant currently making a remark by one of a plurality of different switching methods which is determined in accordance with the speech quantity information of the participant currently making a remark.

36 Claims, 10 Drawing Sheets

TELEVISION CONFERENCE SYSTEM

BACKGROUND OF THE INVENTION

The present invention relates to a television conference system realizing a television conference by use of a plurality of terminal devices placed at multiple points, and in particular, to a video switching control technique which is employed when video images displayed by the terminal devices are switched by identifying a speaker (participant of a conference who is currently speaking).

In a technique used in a conventional television conference system, the speaker who is currently speaking is identified based on sounds picked up by microphones of the terminal devices respectively placed at multiple points, and the video images are switched to those of the speaker who is currently speaking. An example of the conventional television conference system is disclosed in Japanese Patent Provisional Publication No. HEI 05-111020.

In general, as the number of participants of a conference increases, it becomes more difficult for each participant to identify the speaker currently speaking based on the sound only. Therefore, the video switching technique, enabling the participants to easily grasp who is the speaker by the switching of video images in response to speech (remark, comment, response, etc.) of each speaker, has become extremely useful.

The above television conference system is provided with a time setting module for setting the timing of the switching of the screen (video). When the screen is switched, the pre-switching state is held for a time period which is set by the time setting module.

However, it is not preferable that the images are switched excessively frequently. The television conference system of the publication indicated above is configured to avoid excessively frequent video switching by maintaining a pre-switching state (state before the switching) for a preset time period when the image as displayed is switched. That is, the images are switched only when the new speaker is identified and the preset time period has elapsed.

In the television conference system disclosed in the above-indicated publication, therefore, the excessive switching can be prevented. However, the image before switching is kept for the preset time period at every switching, and thus the participants cannot view the images of the current speaker at the beginning of the speech of the current speaker.

SUMMARY OF THE INVENTION

In view of the purpose of identifying the speaker currently speaking, it is preferable that the video is switched quickly. However, although the technique disclosed in the publication is capable of avoiding frequent screen switching, the screen is not switched to the next screen immediately and the participants can not quickly check the facial expression of the speaker who is currently speaking, since the technique holds the pre-switching state for the preset time period on each video switching.

If the currently speaking speaker is not displayed on the screen, the voice of the current speaker does not correspond to the displayed image and thereby the participants may have a feeling of strangeness in the progress of the television conference.

The present invention is advantageous in that an improved television conference system is provided, which is capable of enabling the participants of the conference to check the facial expression of the currently speaking speaker instantly when the speaker changes, while preventing excessively frequent video switching.

According to an aspect of the invention, there is provided a television conference system enabling a plurality of participants to communicate with each other using terminal devices connected to a controller via information transfer system, in which the controller includes switching method storage system which stores a plurality of switching methods for switching video images displayed by the terminal devices; first identification system which compares audio signals transmitted from the terminal devices and thereby identifies a terminal device having the audio signal of the highest sound level, switching method extraction system which extracts one of the switching methods from the switching method storage system based on the frequency of speech of the participant using the terminal device identified by the first identification system, and video switching system which switches the video images displayed by the terminal devices into video images of the participant using the identified terminal device according to the switching method extracted by the switching method extraction system.

Optionally, the switching method storage system stores a plurality of switching methods that require different time lengths for the switching of the video images.

Further optionally, the controller may include speech time measurement system having judgment system for judging whether the sound level of the audio signal transmitted from each terminal device exceeds a preset first threshold value or not at preset time intervals, which counts the number of frames as the preset time intervals in which the judgment system judged that the sound level exceeded the first threshold value and thereby converts speech time of each participant into a count; and count storage system which stores the count regarding each terminal device counted by the speech time measurement system. The switching method extraction system extracts the switching method based on the counts stored in the count storage system.

Still optionally, the speech time measurement system may include two or more measurement system whose count starting points are set differently. The count storage system includes two or more storage system corresponding to the two or more measurement system for storing the counts taken by the measurement system.

Further, the speech time measurement system may include two or more measurement system whose count starting points are set differently. Therefore, the switching method extraction system can refer to the speech frequency of each participant from different points of view, and the video switching system is allowed to switch the video images based on more practical speech frequencies of the participants.

Furthermore, the controller may include weight setting system which sets weights to the counts stored in each storage system. The switching method extraction system extracts the switching method based on the counts stored in each storage system and the weights set by the weight setting system.

Optionally, the weight setting system may set coefficients as the weights. The controller may further include functional calculation system which calculates a switching control value f for each terminal device according to a function which is expressed by the counts stored in the storage system and the coefficients. The switching method extraction system extracts the switching method based on the switching control values f calculated by the functional calculation system.

Still optionally, the speech time measurement system includes: first measurement system which counts total speech time from the start of the conference; and second measurement system which counts speech time from the latest speech start point. The count storage system includes first storage system which stores each count ($A_a$) taken by the first measurement system for each terminal device, and second storage system which stores each count ($A_t$) taken by the second measurement system for each terminal device. The controller further includes second identification system which identifies a terminal device having the highest count stored in the first storage system and a terminal device having the highest count stored in the second storage system. The function is expressed as $f=\alpha A_a/A_{amax}+\beta A_t/A_{tmax}$, where $\alpha+\beta=1$ ($\alpha, \beta \geq 0$), $\alpha$ and $\beta$ are the coefficients set by the weight setting system, $A_{amax}$ denotes the count of the terminal device having the highest count stored in the first storage system identified by the second identification system, and $A_{tmax}$ denotes the count of the terminal device having the highest count stored in the second storage system identified by the second identification system.

Optionally, the controller may include difference calculation system which calculates the difference between the switching control value f of the terminal device identified by the first identification system and the switching control value f of the terminal device used by the participant currently displayed. The switching method extraction system extracts the switching method based on the difference calculated by the difference calculation system.

Optionally, the switching method storage system stores a fade-in fade-out video switching program and an instantaneous video switching program as the video switching methods. The switching method extraction system extracts the instantaneous video switching program when the difference calculated by the difference calculation system is a preset second threshold value or more. The switching method extraction system extracts the fade-in fade-out video switching program when the difference calculated by the difference calculation system is less than the second threshold value.

Further, the video switching system may switch the video images instantaneously when there is a remarkable difference between the speech frequency of the participant using the terminal device identified by the first identification system and the speech frequency of the currently displayed participant. On the other hand, the video switching system switches the video images by the fade-in fade-out method when the difference is small. Therefore, even when the difference is small, the video switching is carried out by the video switching system by system of the fade-in fade-out method, by which video images of the participants before and after the video switching are displayed on the screen being superimposed on each other and thereby the participants of the conference can constantly check the facial expression of the currently speaking participant.

Furthermore, the controller may include priority order setting system which sets priority order to the participants using the terminal devices. The switching method extraction system extracts the switching method based on the counts taken by the speech time measurement system and the priority order set by the priority order setting system.

Optionally, the controller may include weight setting system which sets weights to the counts taken by the speech time measurement system and the priority order set by the priority order setting system. The switching method extraction system extracts the switching method based on the counts stored in the count storage system, the priority order set by the priority order setting system and the weights set by the weight setting system.

Further optionally, the speech time measurement system may include two or more measurement system whose count starting points are set differently. The count storage system includes two or more storage system corresponding to the two or more measurement system for storing the counts taken by the measurement system. The weight setting system sets the weights to the counts stored in each storage system and the priority order set by the priority order setting system. The switching method extraction system extracts the switching method based on the counts stored in each storage system, the priority order set by the priority order setting system and the weights set by the weight setting system.

Still optionally, the weight setting system may set coefficients as the weights. The controller further includes functional calculation system which calculates a switching control value f for each terminal device according to a function expressed by the count(s), the priority order and the coefficients. The switching method extraction system extracts the switching method based on the switching control values f calculated by the functional calculation system.

Further, the speech time measurement system may include first measurement system which counts total speech time from the start of the conference, and second measurement system which counts speech time from the latest speech start point. The count storage system includes first storage system which stores each count ($A_a$) taken by the first measurement system for each terminal device, and second storage system which stores each count ($A_t$) taken by the second measurement system for each terminal device. The priority order set by the priority order setting system is expressed in terms of priority numbers ($A_p$) that get larger as the priority gets higher. The controller further includes second identification system which identifies a terminal device having the highest count stored in the first storage system and a terminal device having the highest count stored in the second storage system. The function is expressed as $f=\alpha A_a/A_{amax}+\beta A_t/A_{tmax}+\gamma A_p/A_{pmax}$, where $\alpha+\beta+\gamma=1$ ($\alpha, \beta, \gamma \geq 0$), $\alpha, \beta$ and $\gamma$ are the coefficients set by the weight setting system, $A_{amax}$ denotes the count of the terminal device having the highest count stored in the first storage system identified by the second identification system, $A_{tmax}$ denotes the count of the terminal device having the highest count stored in the second storage system identified by the second identification system, and $A_{pmax}$ denotes the priority number of a terminal device having the highest priority.

Further optionally, the controller may be provided with difference calculation system which calculates the difference between the switching control value f of the terminal device identified by the first identification system and the switching control value f of the terminal device used by the participant currently displayed. The switching method extraction system extracts the switching method based on the difference calculated by the difference calculation system.

Still optionally, the switching method storage system may be configured to store a fade-in fade-out video switching program and an instantaneous video switching program as the video switching methods. The switching method extraction system extracts the instantaneous video switching program when the difference calculated by the difference calculation system is a preset second threshold value or more. The switching method extraction system extracts the fade-in fade-out video switching program when the difference calculated by the difference calculation system is less than the second threshold value.

In a particular case, the video switching system switches the video images instantaneously when there is a remarkable difference of the speech frequency and priority between the participant using the terminal device identified by the first identification system and the currently displayed participant. On the other hand, the video switching system switches the video images by the fade-in/fade-out method when the difference is small. Therefore, even when the difference is small, the video switching is carried out by the video switching system by system of the fade-in fade-out method, by which video images of the participants before and after the video switching are displayed on the screen being superimposed on each other and thereby the participants of the conference can constantly check the facial expression of the currently speaking participant.

According to another aspect of the invention, there is provided a television conference system enabling a plurality of participants to communicate with each other using terminal devices connected to a controller via information transfer system, each of the terminal devices being provided with a display for displaying a participant making a remark. The television conference system includes a speech quantity information obtaining system that obtains speech quantity information related to quantity of speech of each of the plurality of participants during a conference, a terminal identifying system that identifies a terminal corresponding to a participant currently making a remark, and an image switching system that switches images displayed on the displays of the plurality of terminal devices from a previous participant to the participant currently making a remark by one of a plurality of different switching methods which is determined in accordance with the speech quantity information of the participant currently making a remark.

According to a further aspect of the invention, there is provided a method for switching images employed in a television conference system that enables a plurality of participants to communicate with each other using terminal devices connected to a controller via information transfer system, each of the terminal devices being provided with a display for displaying a participant making a remark. The method may include the steps of (a) obtaining speech quantity information related to quantity of speech of each of the plurality of participants during a conference, (b) identifying a terminal corresponding to a participant currently making a remark, and (c) switching images displayed on the displays of the plurality of terminal devices from a previous participant to the participant currently making a remark by one of a plurality of different switching methods which is determined in accordance with the speech quantity information of the participant currently making a remark.

Optionally, the speech quantity information may include a plurality of types of information related to quantities of speech measured in a plurality of different measuring methods, respectively.

In a particular case, the plurality of types of information are weighted.

Still optionally, the speech quantity information may include information related to speech time of each participant per single remark.

Further optionally, the speech quantity information may include information related to accumulated-speech time of each participant from the beginning of the conference.

Optionally, the plurality of terminal devices may be assigned with a plurality of predetermined parameter values, respectively, the image switching system switching the images by a method that is determined in accordance with the speech quantity information of the participant currently making a remark and the parameter value assigned to the terminal device corresponding to the participant currently making a remark.

In this case, the plurality of types of information and the parameter value may be weighted.

Further, the predetermined parameter values may include values representing priority.

Still optionally, the image switching system may be configured to determine one of the plurality of switching methods in accordance with the speech quantity information of the participant currently making a remark and the speech quantity information of the participant previously displayed on the displays of the terminal devices.

Further optionally, the plurality of different switching methods may have at least different transition time periods which are necessary for switching displayed images.

BRIEF DESCRIPTION OF THE ACCOMPANYING DRAWINGS

FIG. 1 schematically shows an overall configuration of a television conference system;

DETAILED DESCRIPTION OF THE EMBODIMENT

Figure 1:
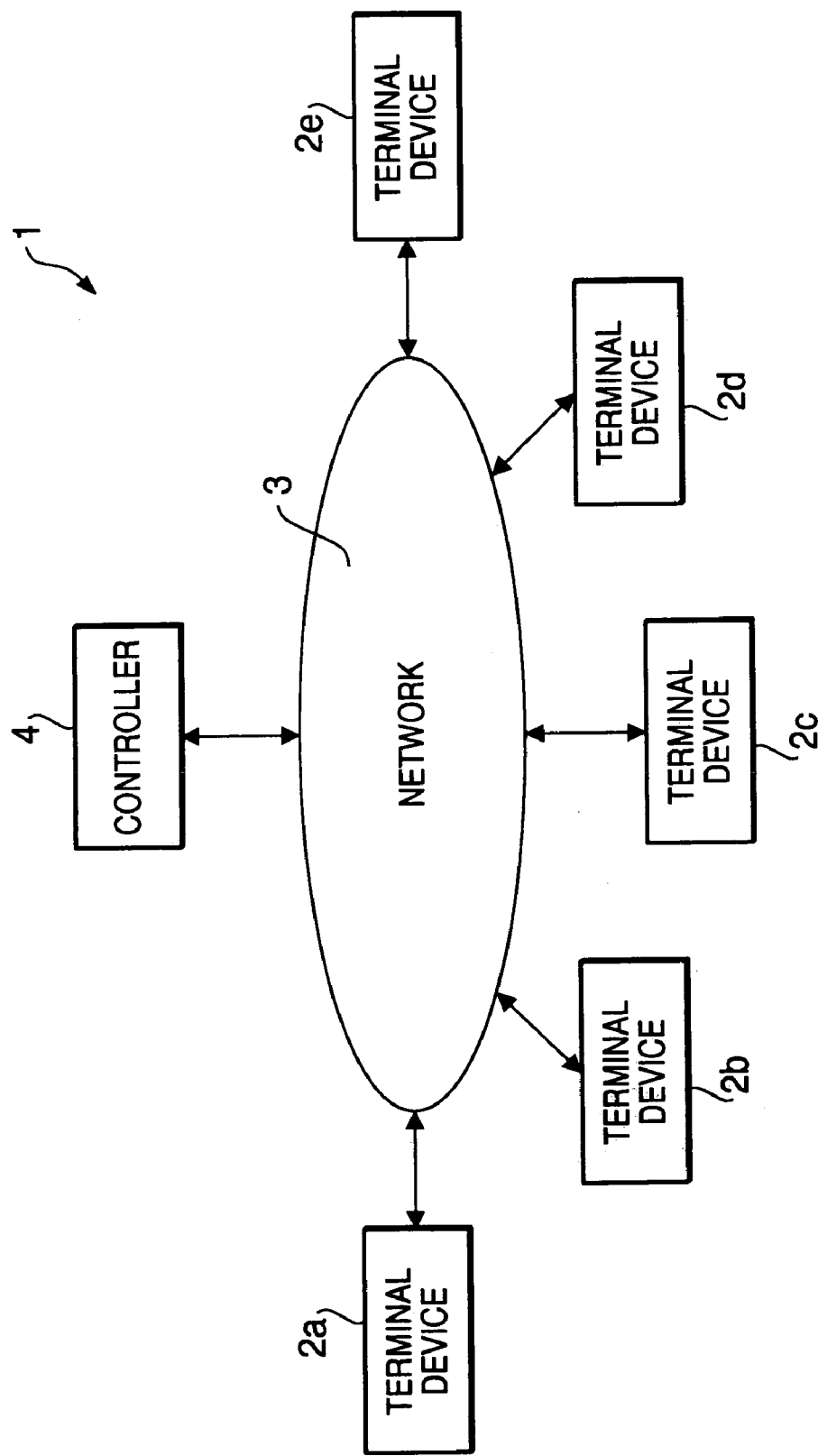

Referring now to the drawings, a description will be given in detail of an embodiment and its modifications in accordance with the present invention.

FIG. 1 is a block diagram showing the overall configuration of a television conference system 1 in accordance with an embodiment of the present invention. The television conference system 1 includes a plurality of terminal devices 2a–2e and a controller 4 which mixes audio signals output by the terminal devices 2a–2e and mixes video images to be displayed by the terminal devices 2a–2e in order to let the terminal devices 2a–2e communicate with each other. Each terminal device 2a–2e is connected to the controller 4 via a network 3. Participants of the conference can communicate with each other through the terminal devices 2a–2e.

<Configuration of Terminal Device>

Next, the configuration of each terminal device 2a–2e placed at each point will be described. In the example of FIG. 1, five terminal devices 2a–2e are connected through the network 3. The terminal devices 2a–2e have the same configuration, therefore, an explanation will be given below on the terminal device 2a only.

Figure 2:
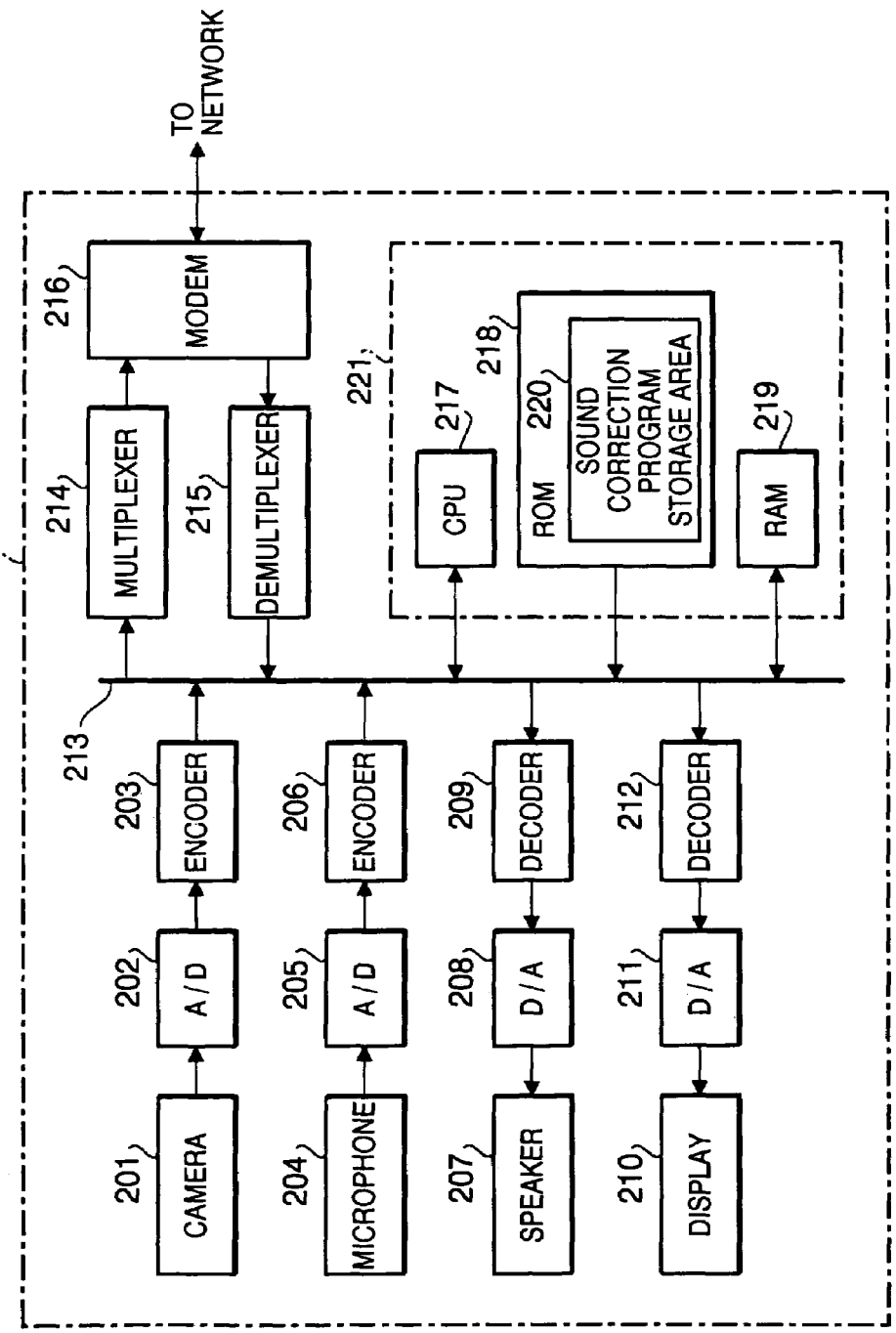
FIG. 2 is a block diagram showing a configuration of a terminal device employed in the television conference system shown in FIG. 1.

FIG. 2 is a block diagram showing the configuration of the terminal device 2a. As shown in FIG. 2, the terminal device 2a includes a video camera 201, a microphone 204, a speaker 207, a display 210, a central operation module 221 and a modem 216, which are electrically interconnected via a data bus 213.

The camera 201 is connected to the data bus 213 via an A/D (analog-to-digital) converter 202 and an encoder 203. The camera 201 has a function of capturing video images of a participant who uses the terminal device 2a.

The microphone 204 is connected to the data bus 213 via an A/D converter 205 and an encoder 206. The microphone 204 has a function of picking up sound (voice) of the participant using the terminal device 2a.

The A/D converters 202 and 205 have functions of digitizing video data and audio data supplied from the camera 201 and the microphone 204, respectively. The encoders 203 and 206 respectively have functions of compressing the video data and audio data digitized by the A/D converters 202 and 205 by system of a known method such as MPEG.

The speaker 207 is connected to the data bus 213 via a D/A converter 208 and a decoder 209. The speaker 207 has a function of outputting sounds of the participants of the conference mixed by the controller 4.

The display 210 is connected to the data bus 213 via a D/A converter 211 and a decoder 212. The display 210 has a function of outputting video images (of a participant) supplied from the controller 4.

The decoders 209 and 212 are for decompressing the compressed audio data and video data supplied from the controller 4. The D/A converters 208 and 211 have functions of converting the digital audio data and digital video data into analog audio data and analog video data.

The modem 216 is connected to the data bus 213 via a multiplexer 214 and a demultiplexer 215. The modem 216 has functions of transmitting the video data and audio data supplied from the camera 201 and microphone 204 to the controller 4 via the network 3 and receiving video data and audio data supplied from the controller 4.

The multiplexer 214 has a function of synchronizing and multiplexing the video data and audio data compressed by the encoders 203 and 206. The demultiplexer 215 has a function of demultiplexing multiplexed and compressed data received from the controller 4 into video data and audio data. Such data generated by multiplexing video data and audio data will hereinafter will be referred to as "video/audio data".

The central operation module 221 includes a CPU (Central Processing Unit) 217, a ROM (Read Only Memory) 218 and a RAM (Random Access Memory) 219. The central operation module 221 executes a series of controls for the operation of the terminal device 2a. The CPU 217 performs a series of controls based on a prescribed program stored in the ROM 218 using the RAM 219 as a work area.

The ROM 218 has a sound correction program storage area 220 for storing a sound correction program. The CPU 217 executes the sound correction program and thereby realizes a function of correcting the volumes (levels) of the sounds from the microphones 204 of the terminal devices 2a–2e. The function realized by the sound correction program run by the CPU 217 will be referred to as a "sound correction function". Meanwhile, in this embodiment, a ROM 412 of the controller 4 stores a first identification program in its first identification program storage area 414. As will be explained later, a CPU 411 of the controller 4 executes the first identification program and thereby identifies one of the terminal devices 2a–2e that is outputting audio data of the highest volume (sound level). The sound correction function is a function for compensating for innate volume difference among the voices of the participants using the terminal devices 2a–2e and thereby preventing the CPU 411 of the controller 4 (running the first identification program) from preferentially identifying and selecting a particular participant who originally has loud voice. Sounds uttered by the participants using the terminal devices 2a–2e are handled evenly among the terminal devices 2a–2e thanks to the sound correction function.

In this embodiment, before the conference is started, a coordinator of the conference asks each participant to speak to the microphone of each terminal device for a preset time period. When each participant starts speaking, the CPU 217 runs various relevant programs stored in the ROM 218 and thereby takes a weighted average of the volume (sound level) of the speech of each participant picked up by the microphone 204 during the preset time period. After awhile, the CPU 217 stores the average volume (obtained by the weighted averaging) in the RAM 219. Each average volume stored in the RAM 219 will be used as a reference value which indicates the volume (sound level) of the voice of each participants using each terminal device 2a–2e.

After the conference is started, measured values of the volume of sound successively inputted through the microphone 204 are reduced by the reference value stored in the RAM 219 by the aforementioned sound correction function. The value of the volume after being reduced by the reference value is transmitted to the controller 4 as volume data, together with the audio data. By the above process, the CPU 411 of the controller 4 executing the first identification program is prevented from preferentially identifying and selecting a particular participant originally having loud voice, by which sounds uttered by the participants using the terminal devices 2a–2e are handled evenly among the terminal devices 2a–2e.

<Configuration of Controller>

Next, the configuration of the controller 4 employed in this embodiment will be described.

Figure 3:
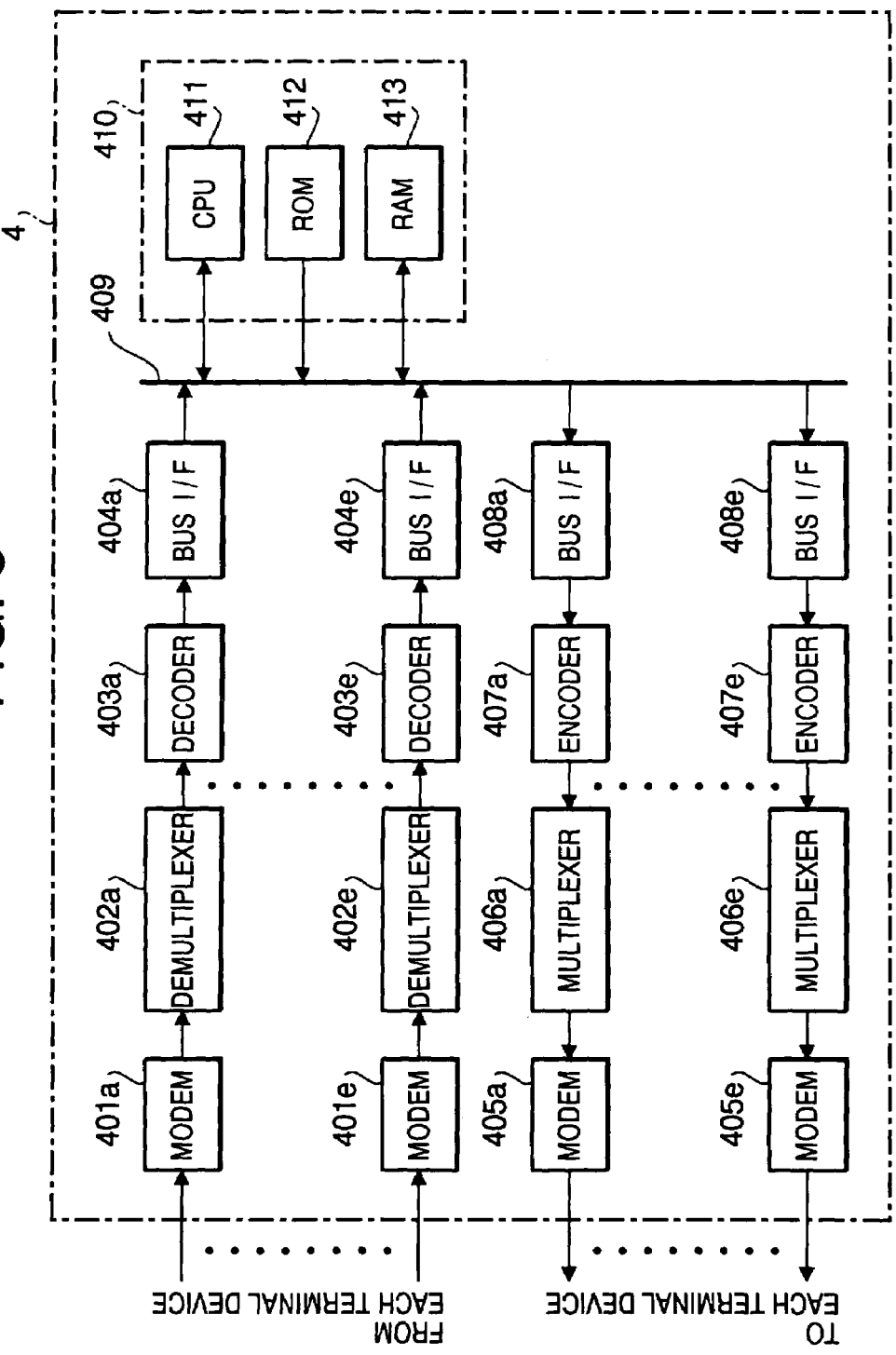
FIG. 3 is a block diagram showing the configuration of a controller employed in the television conference system shown in FIG. 1.

FIG. 3 is a block diagram showing the configuration of the controller 4.

As shown in FIG. 3, the controller 4 includes reception modems 401a–401e and transmission modems 405a–405e (corresponding to the terminal devices 2a–2e) and a central control unit 410 which are electrically connected together by a data bus 409.

The controller 4 in this embodiment monitors the terminal devices 2a–2e via the network 3 shown in FIG. 1 and carries out a series of controls for operating the television conference system 1.

Interfaces of the controller 4 for communicating with the terminal devices 2a–2e have the same configuration, therefore, only an interface corresponding to the terminal device 2a will be explained below.

As shown in FIG. 3, the reception modem 401a is connected to the data bus 409 via a demultiplexer 402a, a decoder 403a and a bus I/F 404a.

The video/audio data received from the terminal device 2a is demultiplexed by the demultiplexer 402a and then decompressed by the decoder 403a, by which the video/audio data is separated into video data and audio data. The video data and audio data are inputted to the bus I/F 404a.

The transmission modem 405a is connected to the data bus 409 via a multiplexer 406a, an encoder 407a and a bus I/F 408a.

Video data and audio data to be transmitted from the controller 4 to the terminal device 2a are compressed by the encoder 407a, multiplexed by the multiplexer 406a, and then transmitted by the transmission modem 405a.

Next, the control unit of the controller 4 will be explained.

The central control unit 410, for generating video images to be displayed by the terminal devices 2a–2e and mixing sounds output by the terminal devices 2a–2e, includes the CPU 411, the ROM 412 and a RAM 413.

The CPU 411 activates a program stored in the ROM 412 and thereby controls the switching of the video images displayed by the terminal devices 2a–2e and the output of sounds.

The ROM 412 stores programs for controlling the overall operation of the television conference system 1, including programs for carrying out processes of this embodiment which are shown in the flowcharts of FIGS. 6 through 10.

In the following, the ROM 412 employed in this embodiment will be explained referring to FIG. 4.

Figure 4:
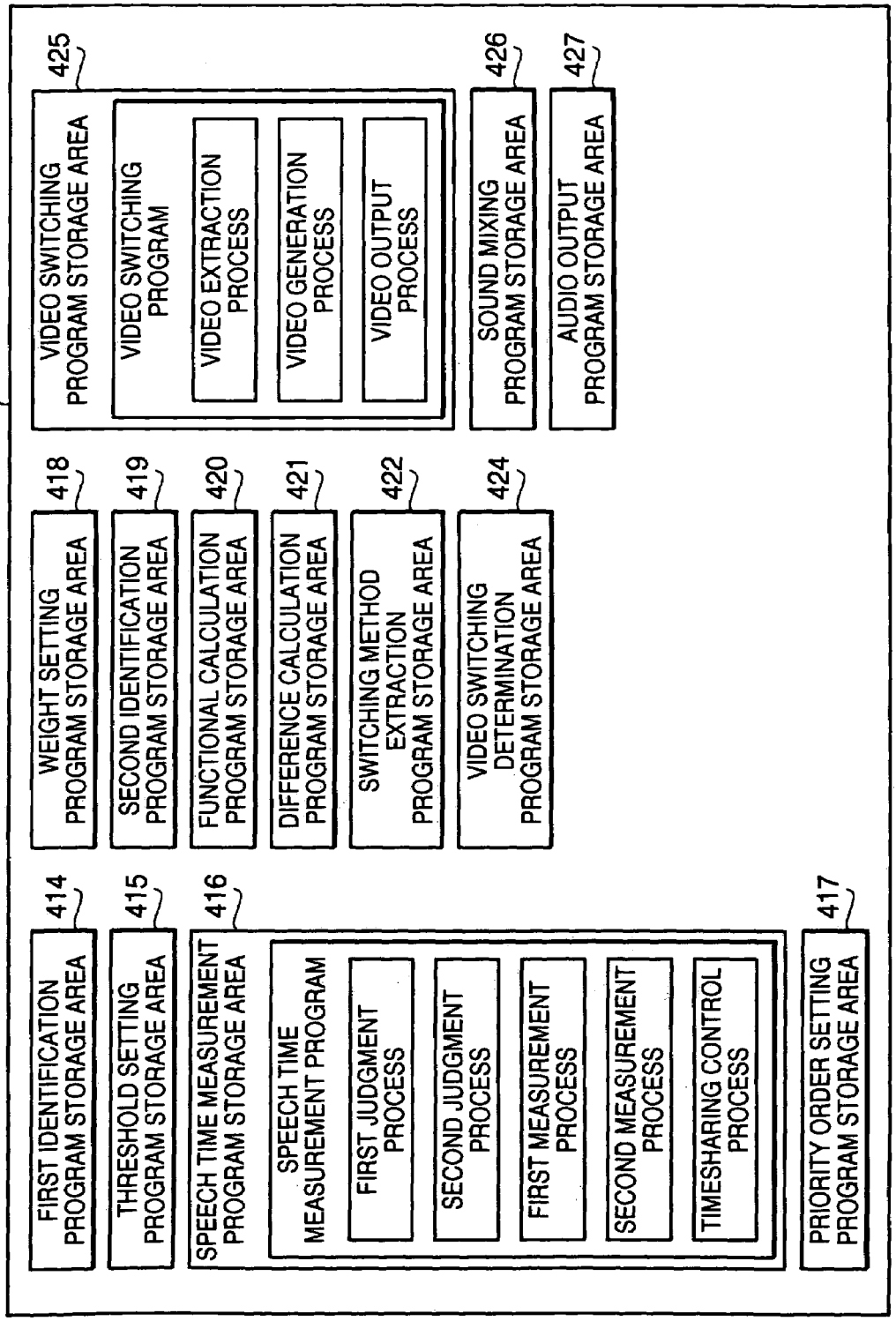
FIG. 4 is an explanatory drawing showing memory contents of a ROM of the controller shown in FIG. 3.

FIG. 4 is an explanatory drawing schematically showing the configuration of memory contents of the ROM 412.

The ROM 412 has the first identification program storage area 414, a threshold setting program storage area 415, a speech time measurement program storage area 416, a priority order setting program storage area 417, a weight setting program storage area 418, a second identification program storage area 419, a functional calculation program storage area 420, a difference calculation program storage area 421, a switching method extraction program storage area 422, a video switching determination program storage area 424, a video switching program storage area 425, a sound mixing program storage area 426, and an audio output program storage area 427.

The first identification program storage area 414 is a memory area for storing the first identification program. The first identification program is executed by the CPU 411. The CPU 411 runs the first identification program and thereby realizes a function of comparing the volumes of the audio data received from the terminal devices 2a–2e via the reception modems 401a–401e and identifying and selecting a participant (terminal device) of the highest volume out of the terminal devices 2a–2e. The function realized by the first identification program run by the CPU 411 will be referred to as a first identification function.

The threshold setting program storage area 415 is a memory area for storing a threshold setting program. The threshold setting program is executed by the CPU 411. The CPU 411 runs the threshold setting program according to a threshold setting operation by the conference coordinator and thereby realizes a function of setting first and second threshold values which will be explained later. The function realized by the threshold setting program run by the CPU 411 is a threshold setting function. The threshold setting operation is done by the conference coordinator by pressing threshold setting buttons of the controller 4. The first and second threshold values set by the threshold setting function are stored in a threshold storage area 452 of the RAM 413 which will be explained later.

The speech time measurement program storage area 416 is a memory area for storing a speech time measurement program. The speech time measurement program is a program executed by the CPU 411. The speech time measurement program is composed of a measurement process, a judgment process and a timesharing control process. The CPU 411 runs the speech time measurement program and thereby realizes a function of measuring the frequency of speech of each participant using each terminal device 2a–2e (i.e., how often each participant speaks). The function realized by the speech time measurement program run by the CPU 411 will be referred to as a speech time measurement function.

In this embodiment, the speech time measurement program includes a first measurement process and a second measurement process. The CPU 411 executes the first measurement process of the speech time measurement program and thereby realizes a function of measuring total speech time (i.e., accumulated speech time) of each participant from the start of the television conference. The function realized by the first measurement process of the speech time measurement program run by the CPU 411 will be referred to as a first measurement function.

The CPU 411 also executes the second measurement process of the speech time measurement program and thereby realizes a function of measuring speech time of each participant from the start of each speech (remark, comment, response, etc.). The function realized by the second measurement process of the speech time measurement program run by the CPU 411 will be referred to as a second measurement function. By the second measurement function, if speech of a participant pauses, speech time from the point when the participant restarts speaking is measured. As explained above, the first measurement function and the second measurement function employ different measurement starting points (count starting points) for measuring the speech frequency of each participant.

The speech time measurement program further includes a first judgment process and a second judgment process. The CPU 411 executes the first judgment process when the time is counted by the first measurement function and thereby realizes a function of judging whether or not the volume of the audio data received from each terminal device 2a–2e exceeds the first threshold value stored in the threshold storage area 452 of the RAM 413 which will be explained later. The CPU 411 also executes the second judgment process when the time is counted by the second measurement function and thereby realizes a function of judging whether or not the volume of the audio data received from each terminal device 2a–2e exceeds the first threshold value stored in the threshold storage area 452 of the RAM 413. The function realized by the first judgment process executed by the CPU 411 will be referred to as a first judgment function. The function realized by the second judgment process executed by the CPU 411 will be referred to as a second judgment function.

The speech time measurement program further includes the timesharing control process. The CPU 411 executes the timesharing control process of the speech time measurement program and thereby realizes the first measurement function and the second measurement function for all the terminal devices 2a–2e by system of time sharing. The function realized by the timesharing control process executed by the CPU 411 will be referred to as a timesharing control function.

The counts taken by the first measurement function and the second measurement function are stored in a count storage area 453 of the RAM 413 which will be explained later. In this case, the counts taken by the first measurement function are stored in first storage areas 461a–461e respectively corresponding to the terminal devices 2a–2e, while the counts taken by the second measurement function are stored in second storage areas 462a–462e respectively corresponding to the terminal devices 2a–2e.

The priority order setting program storage area 417 is a memory area for storing a priority order setting program. The priority order setting program is a program executed by the CPU 411. The CPU 411 runs the priority order setting program according to a priority order setting operation by the conference coordinator and thereby realizes a function of setting priority order (priority numbers) to the terminal devices 2a–2e. The function realized by the priority order setting program run by the CPU 411 will be referred to as a priority order setting function.

The priority order setting operation is done by the conference coordinator by pressing priority order setting buttons of the controller 4. The priority order set by the priority order setting function is expressed by natural numbers 1–5, in which priority numbers 5, 4, 3, 2 and 1 are assigned to the terminal devices starting from a terminal device having the highest priority. The priority order set by the priority order setting function (priority numbers assigned to the terminal devices 2a–2e) is stored in a priority order storage area 454 of the RAM 413 which will be explained later.

The weight setting program storage area 418 is a memory area for storing a weight setting program. The weight setting program is executed by the CPU 411. The CPU 411 runs the weight setting program according to a weight setting operation by the conference coordinator and thereby realizes a function of assigning relative weights to three elements: the count stored in the first storage area (461a–461e), the count stored in the second storage area (462a–462e), and the priority order (priority number) stored in the priority order storage area 454.

The weight setting operation is done by the conference coordinator using weight setting buttons of the controller 4. The function realized by the weight setting program run by the CPU 411 will be referred to as a weight setting function. The weights are set by the weight setting function as coefficients $\alpha$, $\beta$ and $\gamma$. The coefficient a denotes a weight corresponding to the count stored in the first storage area (461a–461e). The coefficient $\beta$ denotes a weight corresponding to the count stored in the second storage area (462a–462e). The coefficient $\gamma$ denotes a weight corresponding to the priority order (priority number) stored in the priority order storage area 454. The weights (coefficients $\alpha$, $\beta$ and $\gamma$) set by the weight setting function are stored in a weight storage area 455 of the RAM 413 which will be explained later.

The second identification program storage area 419 is a memory area for storing a second identification program. The second identification program is executed by the CPU 411. The CPU 411 runs the second identification program and thereby realizes a function of identifying a terminal device having the highest count in the counts stored in the first storage areas 461a–461e and a terminal device having the highest count in the counts stored in the second storage areas 462a–462e. The function realized by the second identification program run by the CPU 411 will be referred to as a second identification function.

The functional calculation program storage area 420 is a memory area for storing a functional calculation program. The functional calculation program is a program executed by the CPU 411. The CPU 411 runs the functional calculation program and thereby realizes a function of calculating a function stored in a function storage area 456 of the RAM 413 which will be explained later. The function is calculated as a "switching control value f" as will be explained later. The function realized by the functional calculation program run by the CPU 411 will be referred to as a functional calculation function. The switching control value f is calculated by the functional calculation function for each terminal device 2a–2e.

The difference calculation program storage area 421 is a memory area for storing a difference calculation program. The difference calculation program is a program executed by the CPU 411. The CPU 411 runs the difference calculation program and thereby realizes a function of calculating the difference between the switching control value f of the terminal device identified by the first identification function and the switching control value f of a terminal device used by a participant being displayed by the terminal devices 2a–2e. Specifically, the difference is obtained by subtracting the switching control value f of the terminal device used by the participant being displayed by the terminal devices 2a–2e from the switching control value f of the terminal device identified by the first identification function. The function realized by the difference calculation program run by the CPU 411 will be referred to as a difference calculation function.

The switching method extraction program storage area 422 is a memory area for storing a switching method extraction program. The switching method extraction program is executed by the CPU 411. The CPU 411 runs the switching method extraction program and thereby realizes a function of extracting a switching method from a switching method storage area 458 of the RAM 413 which will be explained later based on the difference obtained by the difference calculation function. The function realized by the switching method extraction program run by the CPU 411 will be referred to as a switching method extraction function.

When the difference obtained by the difference calculation function is larger than or equal to the second threshold value stored in the threshold storage area 452, the switching method extraction function extracts an instantaneous video switching program (which will be explained later) from the switching method storage area 458. Meanwhile, when the calculated difference is smaller than the second threshold value, the switching method extraction function extracts a fade-in fade-out video switching program from the switching method storage area 458.

The video switching determination program storage area 424 is a memory area for storing a video switching determination program. The video switching determination program is executed by the CPU 411. The CPU 411 runs the video switching determination program and thereby realizes a function of determining to switch the video images displayed by the terminal devices 2a–2e when the participant (terminal device) identified by the first identification function is different from the participant being displayed by the terminal devices 2a–2e. The function realized by the video switching determination program run by the CPU 411 is a video switching determination function.

The video switching program storage area 425 is a memory area for storing a video switching program. The video switching program is a program executed by the CPU 411. A function realized by the video switching program run by the CPU 411 will be referred to as a video switching function.

The video switching program is composed of a video extraction process, a video generation process, and a video output process. The CPU 411 executes the video extraction process when the video switching determination function determined to switch the video images displayed by the terminal devices 2a–2e and thereby realizes a function of extracting video images of the terminal device (participant) identified by the first identification function from a video storage area 451 of the RAM 413 which will be explained later.

The function realized by the video extraction process executed by the CPU 411 is referred to as a video extraction function. The CPU 411 also executes the video generation process and thereby realizes a function of generating new video images to be displayed when the video images are switched according to the switching method extracted by the switching method extraction function, based on the video images extracted by the video extraction function and video images of the currently displayed participant.

The function realized by the video generation process executed by the CPU 411 will be referred to as a video generation function. The CPU 411 also executes the video output process and thereby realizes a function of transmitting the new video images generated by the video generation function to the terminal devices 2a–2e via the transmission modems 405a–405e. The function realized by the video output process executed by the CPU 411 is a video output function.

The sound mixing program storage area 426 is a memory area for storing a sound mixing program. The sound mixing program is executed by the CPU 411. The CPU 411 runs the sound mixing program and thereby realizes a function of mixing the audio data inputted through the microphones of the terminal devices 2a–2e together. The function realized by the sound mixing program run by the CPU 411 will be referred to as a sound mixing function.

The audio output program storage area 427 is a memory area for storing an audio output program. The audio output program is executed by the CPU 411. The CPU 411 runs the audio output program and thereby realizes a function of outputting the audio data mixed by the sound mixing function to all the terminal devices 2a–2e via transmission modems 405a–405e corresponding to the terminal devices 2a–2e. The function realized by the audio output program run by the CPU 411 will be referred to as an audio output function.

Incidentally, the video data output by the video output function and the audio data output by the audio output function are synchronized and multiplexed by the encoders 407a–407e and multiplexers 406a–406e and then transmitted to the terminal devices 2a–2e.

Figure 5:
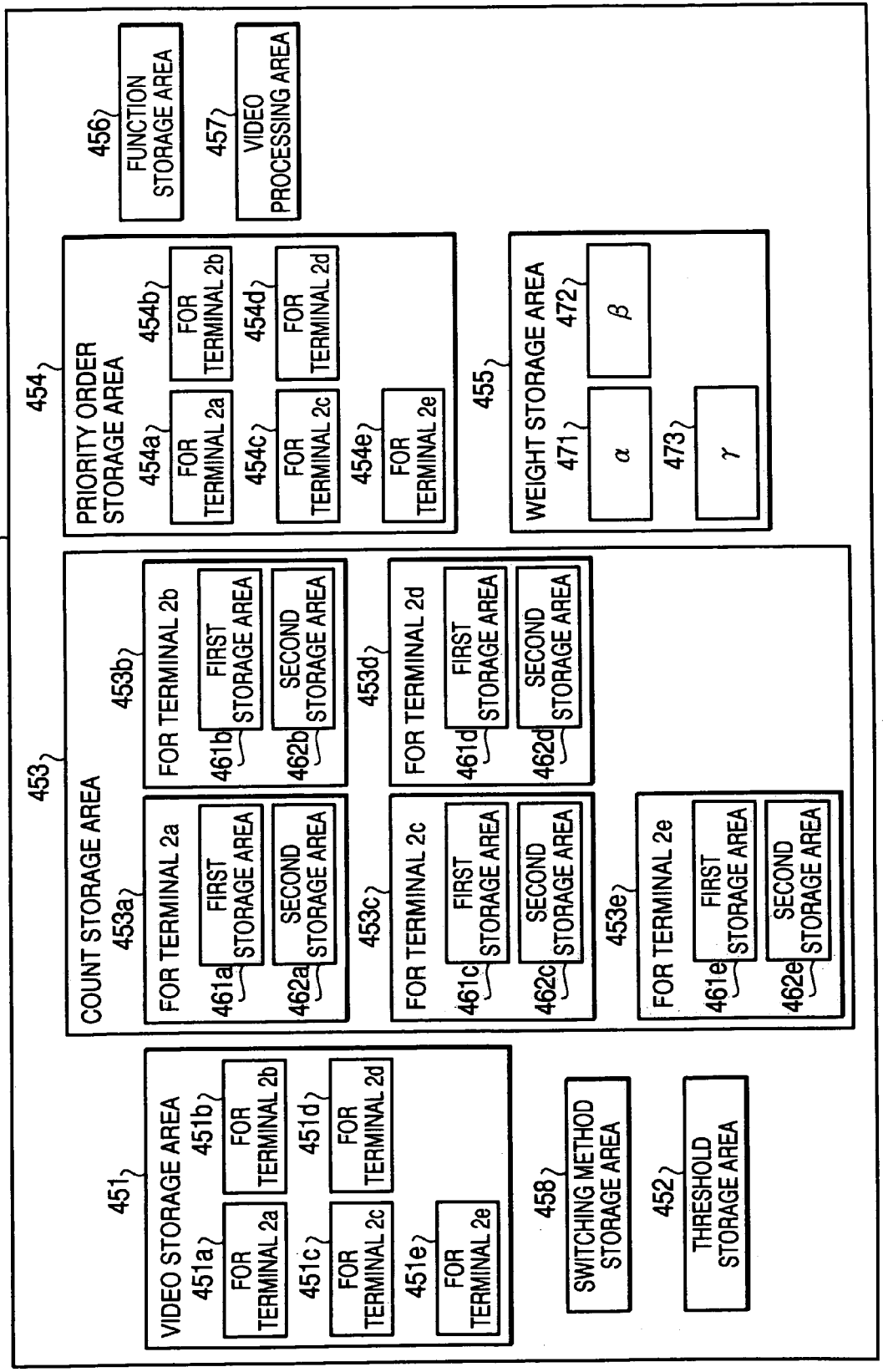
FIG. 5 is an explanatory drawing showing memory contents of a RAM of the controller shown in FIG. 3.

The RAM 413 is a volatile memory, which includes a temporary storage area to be used as a work area by the CPU 411 executing programs. In the following, the RAM 413 employed in this embodiment will be explained referring to FIG. 5. FIG. 5 is an explanatory drawing showing the configuration of memory contents of the RAM 413.

The RAM 413 includes the video storage area 451, the switching method storage area 458, the threshold storage area 452, the count storage area 453, the priority order storage area 454, the weight storage area 455, the function storage area 456 and a video processing area 457.

The video storage area 451 has memory areas 451a–451e corresponding to the terminal devices 2a–2e. Each memory area 451a–451e stores video data inputted through the camera of the corresponding terminal device 2a–2e. The video data demultiplexed and decompressed by the demultiplexers 402a–402e and the decoders 403a–403e shown in FIG. 3 are stored in the memory areas 451a–451e corresponding to the terminal devices 2a–2e, respectively. The alphabetic characters a–e in the reference characters of the memory areas 451a–451e correspond to those of the terminal devices 2a–2e, respectively.

The switching method storage area 458 stores programs to be executed by the CPU 411 when the video images displayed by the terminal devices 2a–2e are switched by the aforementioned video switching function. In this embodiment, the switching method storage area 458 stores the fade-in/fade-out video switching program and the instantaneous video switching program. The fade-in/fade-out video switching program is a program executed by the CPU 411 for gradually switching video (video images) of the participant displayed by the terminal devices 2a–2e into video (video images) of the currently speaking participant by superimposing the latter video on the former video.

Specifically, the video of the participant displayed by the terminal devices 2a–2e is gradually erased (fade-out) while the video of the speaking participant is gradually enhanced (fade-in). The instantaneous video switching program is a program executed by the CPU 411 for instantaneously switching the video of the participant displayed by the terminal devices 2a–2e into the video of the currently speaking participant. In short, the switching method storage area 458 stores programs that specify the timing of the switching of the video images displayed by the terminal devices 2a–2e. The programs stored in the switching method storage area 458 can be rewritten by the conference coordinator.

The threshold storage area 452 stores the first and second threshold values which are set by the aforementioned threshold setting function.

The count storage area 453 has memory areas 453a–453e corresponding to the terminal devices 2a–2e. Each memory area (453a–453e) has a first storage area (461a–461e) and a second storage area (462a–462e). Each of the first storage areas 461a–461e stores the count of the corresponding terminal device 2a–2e taken by the first measurement function, while each of the second storage areas 462a–462e stores the count of the corresponding terminal device 2a–2e taken by the second measurement function. The alphabetic characters a–e. in the reference characters of the storage areas 461a–461e and the storage areas 462a–462e correspond to those of the terminal devices 2a–2e, respectively.

The priority order storage area 454 has memory areas 454a–454e corresponding to the terminal devices 2a–2e. Each of the memory areas 454a–454e stores the priority number of each terminal device 2a–2e set by the priority order setting function. The alphabetic characters a–e in the reference characters of the memory areas 454a–454e correspond to those of the terminal devices 2a–2e, respectively.

The weight storage area 455 has memory areas 471–473 corresponding to the coefficients α, β and γ. Each of the memory areas 471–473 stores each weight set by the weight setting function.

The function storage area 456 stores each function defined by the count stored in each first storage area 461a–461e, the count stored in each second storage area 462a–462e, the priority order (priority number) stored in the priority order storage area 454 and the weights stored in the weight storage area 455. In this embodiment, the function is expressed as:

$$f = \alpha A_a/A_{amax} + \beta A_t/A_{tmax} + \gamma A_p/A_{pmax} \qquad (1)$$

where $\alpha+\beta+\gamma=1$ ($\alpha \geq 0$, $\beta \geq 0$, $\gamma \geq 0$).

In the function (1), α, β and γ are the coefficients indicating the weights set by the aforementioned weight setting function. "$A_a$" denotes the count stored in the first storage area (461a–461e), and "$A_t$" denotes the count stored in the second storage area (462a–462e). "$A_p$" denotes the priority number stored in the priority order storage area 454. "$A_{amax}$" is the count of the terminal device identified by the second identification function as having the largest one of the counts stored in the first storage areas 461a–461e. "$A_{tmax}$" is the count of the terminal device identified by the second identification function as having the largest one of the counts stored in the second storage areas 462a–462e. "$A_{pmax}$" is the priority order (priority number) of the terminal device having the highest priority in the priority order stored in the priority order storage area 454. The function f is a value which is used for controlling the timing of the switching of the video images displayed by the terminal devices 2a–2e in the television conference system 1. The function (1) is referred to as a "switching control value" in this embodiment.

By expressing the switching control value f by such a function, proper relative weights can be assigned to $A_a$, $A_t$ and $A_p$. Further, since the values $A_a$, $A_t$ and $A_p$ are divided by their maximum values $A_{amax}$, $A_{tmax}$ and $A_{pmax}$ respectively, the effects of the values $A_a$, $A_t$ and $A_p$ on the switching control value f can be equalized with each other.

The video processing area 457 provides a work area to be used by the aforementioned video generation function for generating new video images.

Figure 6:
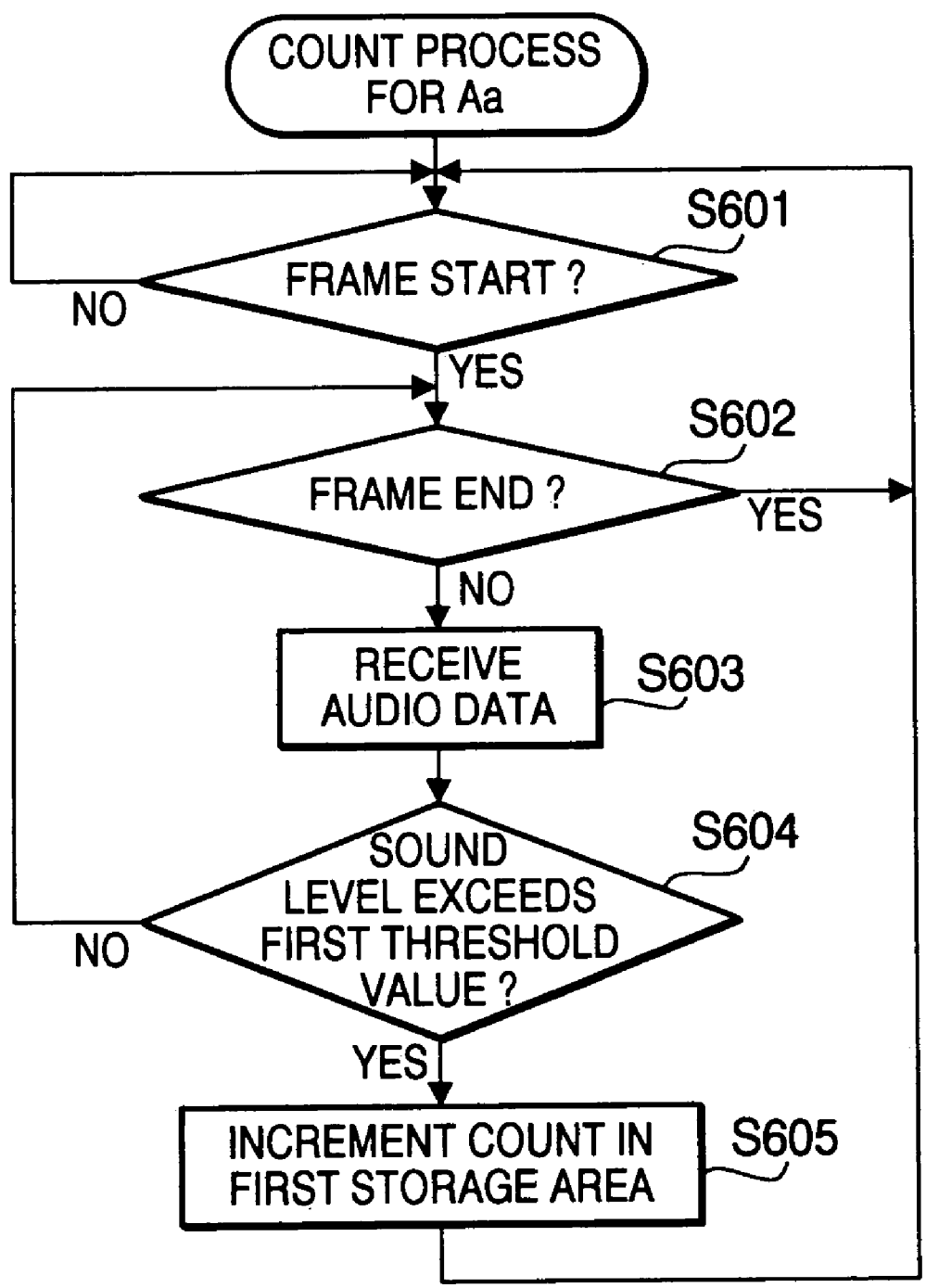
FIG. 6 is a flowchart showing the flow of a count process conducted by a first measurement function.
Figure 7:
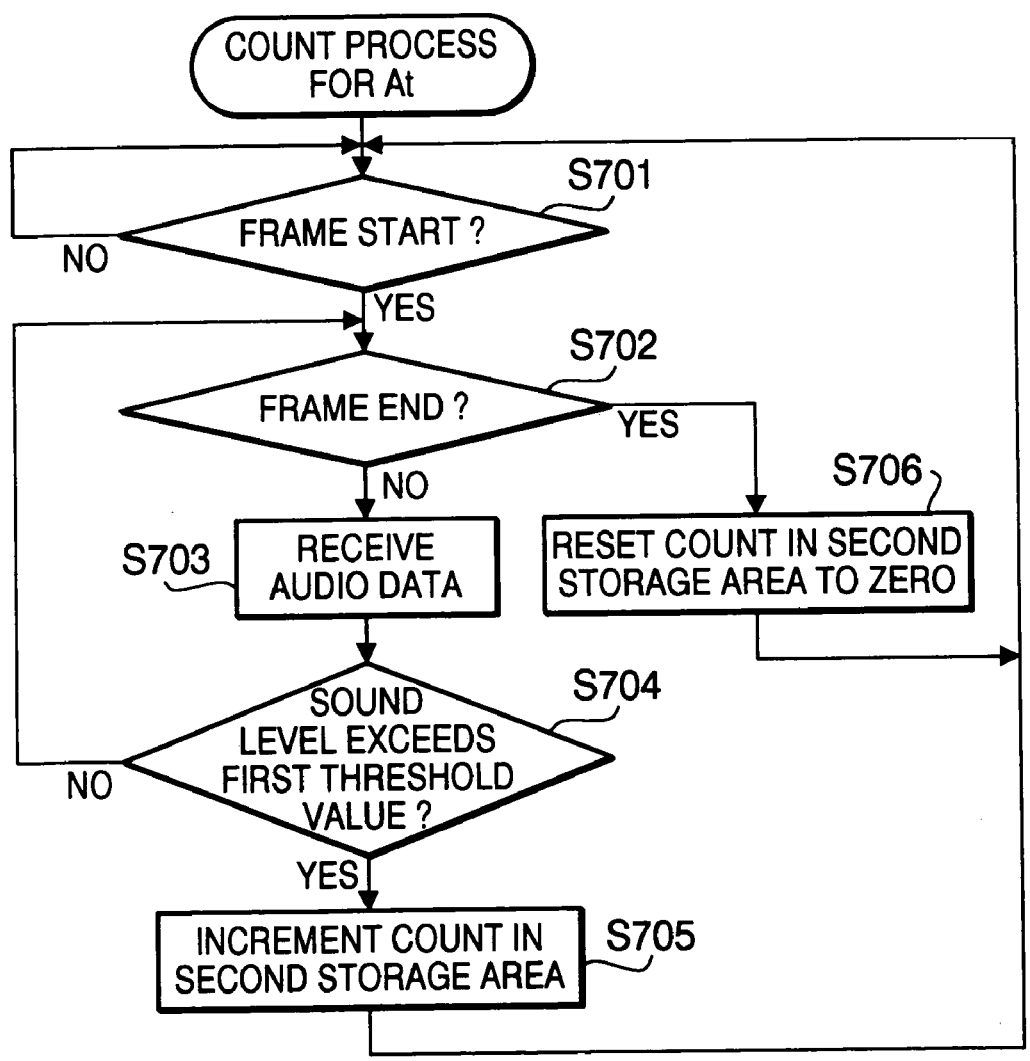
FIG. 7 is a flowchart showing the flow of a count process conducted by a second measurement function.
Figure 8:
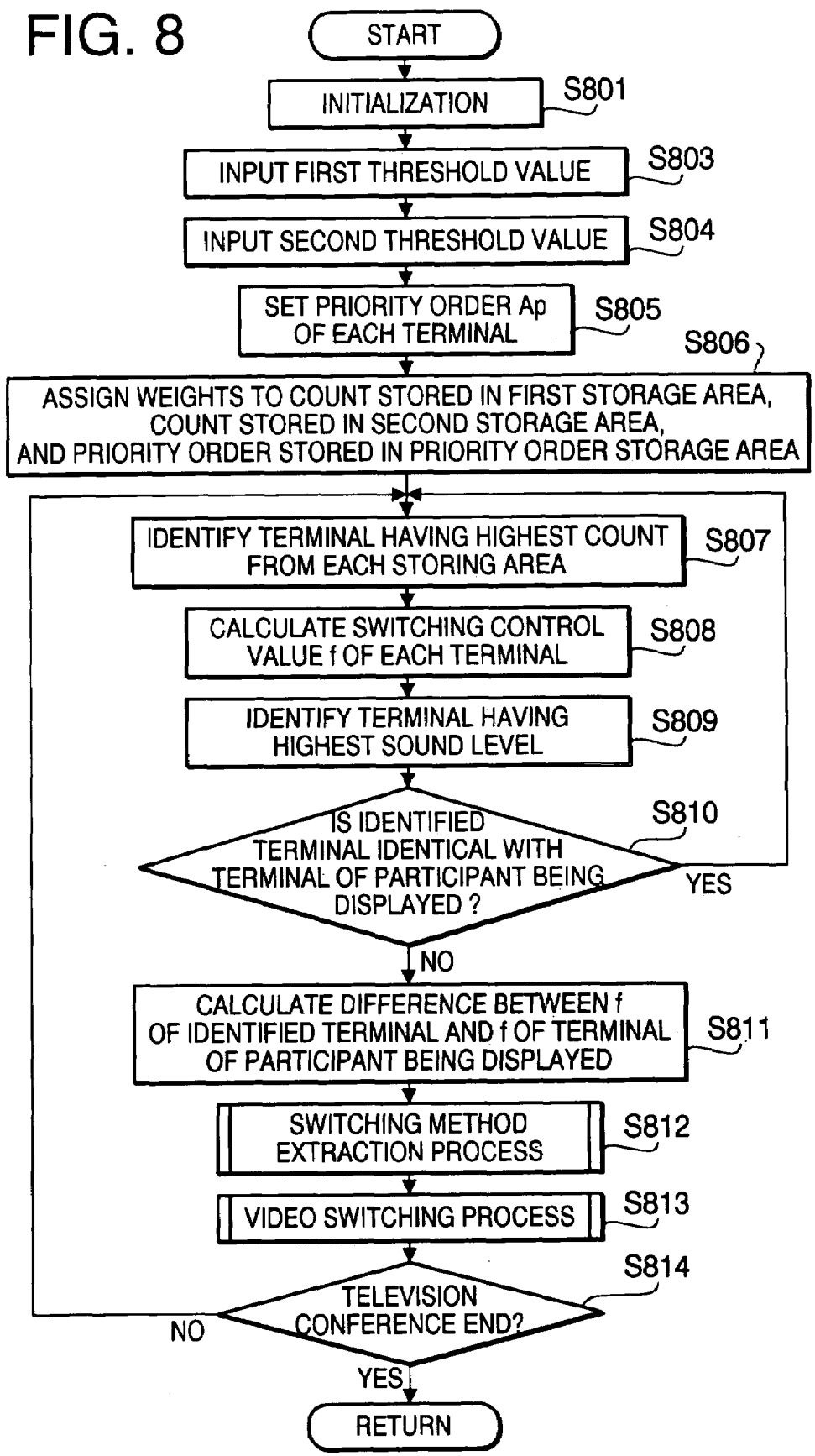
FIG. 8 is a flowchart showing the overall process conducted by the television conference system.
Figure 9:
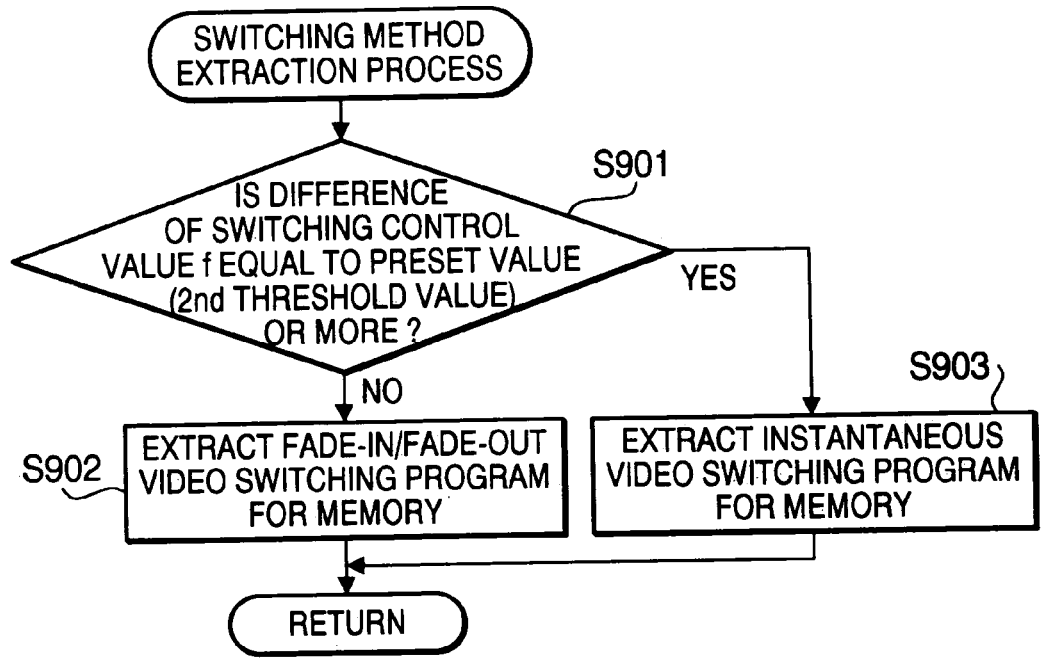
FIG. 9 is a flowchart showing the flow of a switching method extraction process of the television conference system.
Figure 10:
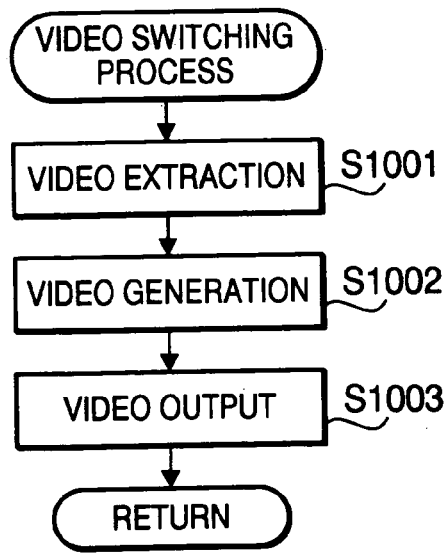
FIG. 10 is a flowchart showing the flow of a video switching process of the television conference system.

In the following, the operation of the television conference system 1 will be explained referring to some flowcharts. FIG. 6 is a flowchart showing the flow of a count process conducted by the first measurement function. FIG. 7 is a flowchart showing the flow of a count process conducted by the second measurement function. FIG. 8 is a flowchart showing the overall process conducted by the television conference system 1. FIG. 9 is a flowchart showing the flow of a switching method extraction process of the television conference system 1. FIG. 10 is a flowchart showing the flow of a video switching process of the television conference system 1.

In this embodiment, the count process by the first measurement function shown in FIG. 6, the count process by the second measurement function shown in FIG. 7 and the process shown in FIG. 8 are executed concurrently by a multitasking OS.

<First Measurement Function>

First, the count process by the first measurement function will be described referring to FIG. 6. From the start of the conference employing the television conference system 1, speaking statuses of the participants using the terminal devices 2a–2e are monitored by the first measurement function until the end of the conference. Specifically, the first measurement function counts the total speech time of each participant from the start. of the conference.

The first measurement function monitors the volume (sound level) of each audio data supplied from each terminal device 2a–2e via each reception modem 401a–401e within an every preset time interval. In this embodiment, a predetermined unit time period (which will be referred to as a "frame") is defined, and the volume of each audio data is sampled and examined a plurality of times within every frame. The length of the frame is, for example, 1 second.

First, in step S601 (hereinafter abbreviated as "S601", ditto for other steps), whether a frame has started or not is determined. When a frame has not started yet (S601: NO), the process returns to S601 and waits for the start of a frame. When a frame has started (S601: YES), the process proceeds to S602, in which whether the frame (determined to have started in S601) has ended or not is determined. When the frame has ended (S602: YES), the process returns to S601 and the judgment on the start of a frame is made again. When the frame has not ended yet (S602: NO), the audio data supplied via the reception modem (401a–401e) are received (S603) and whether the volume (sound level) of the received audio data exceeds the first threshold value stored in the threshold storage area 452 or not is determined by the first judgment function (S604). When the volume is determined to be within the first threshold value (S604: NO), the process returns to S602 and the judgment on the end of the frame is made again. When the volume is determined to exceed the first threshold value (S604: YES), the count stored in the first storage area (461a–461e) is incremented by one (S605), and the process returns to S601. With this control, update of the count value is done on a frame basis.

Figure 11A:
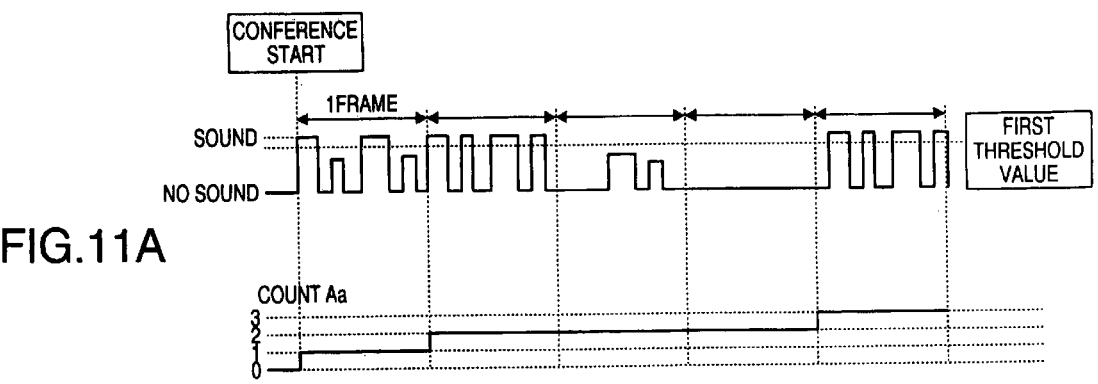
FIGS. 11A and 11B are time-line charts showing count processes conducted by the first and second measurement functions, respectively.

FIG. 11A is a time-line chart showing the process of the flowchart of FIG. 6. As shown in FIG. 11A, the volume of the received audio data is monitored by the first measurement function in each frame, and the count stored in the first storage area (461a–461e) is incremented successively. In each frame, the count is incremented by one if the volume of the sampled (examined) audio data exceeds the first threshold value at least once. The count is incremented by only one even if the first threshold value is exceeded twice or more within a frame.

<Second Measurement Function>

Next, the count process by the second measurement function will be described referring to FIG. 7. From the start of the conference employing the television conference system 1, speaking statuses of the participants using the terminal devices 2a–2e are monitored by the second measurement function until the end of the conference. Specifically, the second measurement function counts the speech time of each participant from the latest speech start point. In other words, if a participant interrupts his/her speech (remark, comment, response, etc.), the time from the point of restart of the speech is counted.

The second measurement function monitors the volume (sound level) of each audio data supplied from each terminal device 2a–2e via each reception modem 401a–401e at every preset time interval (i.e., frame).

First, in S701, whether a frame has started or not is determined. When a frame has not started yet (S701: NO), the process returns to S701 and waits for the start of a frame. When a frame has started (S701: YES), the process proceeds to S702, in which whether the frame (determined to have started in S701) has ended or not is determined. When the frame has ended (S702: YES), the process directly proceeds to S706 and the count stored in the second storage area (462a–462e) is reset to 0. Thereafter, the process returns to S701 and the judgment on the start of a frame is made again. In this configuration, the count regarding a terminal device (stored in the second storage area (462a–462e) corresponding to the terminal device) is reset when a frame ends before the volume of the audio data from the terminal device exceeds the first threshold value, by which the time is counted consistently from the latest speech start point of the participant using the terminal device. When the frame has not ended yet (S702: NO), the audio data supplied via the reception modem (401a–401e) are received (S703) and whether the volume (sound level) of the received audio data exceeds the first threshold value stored in the threshold storage area 452 or not is determined by the second judgment function (S704). When the volume is determined to be within the first threshold value (S704: NO), the process returns to S702 and the judgment on the end of the frame is made again. When the volume is determined to exceed the first threshold value (S704: YES), the count stored in the second storage area ($462a$–$462e$) is incremented by one (S705), and the process returns to S701.

Figure 11B:
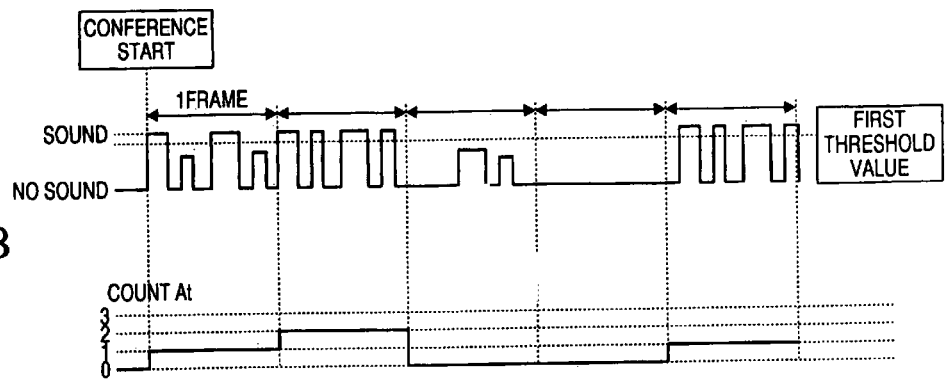

FIG. 11B is a time-line chart showing the process of the flowchart of FIG. 7. As shown in FIG. 11B, the volume of the received audio data is monitored by the second measurement function a plurality of times in each frame and the count stored in the second storage area ($462a$–$462e$) is incremented successively. In each frame, the count stored in a second storage area ($462a$–$462e$) corresponding to a terminal device is incremented by one if the volume of the sampled audio data exceeds the first threshold value at least once. On the other hand, if the volume of the sampled audio data does not exceed the first threshold value during a frame, the count stored in the second storage area ($462a$–$462e$) corresponding to the terminal device is reset to 0. It should be noted that even if the first threshold value is exceeded twice or more within a frame, the count is incremented by only one.

<Overall Process of the TV Conference System>

Next, the overall process conducted by the television conference system 1 will be explained with reference to FIG. 8.

The television conference system 1 is enabled when the power is turned on by the conference coordinator. First, the whole television conference system 1 is initialized (S801). Concretely, the initialization includes the operation check and initialization of the CPU 411, the RAM 413 and the interfaces, the operation check of each component, and initialization of hardware. If no abnormality is detected, data stored in the RAM 413 is cleared. When the initialization procedure is completed, the process proceeds to S803.

In S803, the conference coordinator sets the first threshold value by the threshold setting function and stores the first threshold value in the threshold storage area 452. Thereafter, the process proceeds to S804.

In S804, the conference coordinator sets the second threshold value by the threshold setting function and stores the second threshold value in the threshold storage area 452. Thereafter, the process proceeds to S805.

In S805, the conference coordinator sets the priority order (priority number) $A_p$ to each terminal device $2a$–$2e$ by the priority order setting function and stores the priority order in the priority order storage area 454. The priority numbers of the terminal devices $2a$–$2e$ set by the priority order setting function are stored in the corresponding memory areas $454a$–$454e$, respectively. Thereafter, the process proceeds to S806.

In S806, the conference coordinator assigns weights to the counts $A_a$ stored in the first storage areas $461a$–$461e$, the counts $A_t$ stored in the second storage areas $462a$–$462e$, and the priority numbers $A_p$ stored in the priority order storage area 454. The weights are set by the weight setting function as the coefficients $\alpha$, $\beta$ and $\gamma$ and stored in the memory areas 471–473 of the weight storage area 455 corresponding to the coefficients $\alpha$, $\beta$ and $\gamma$.

The preparation for the television conference is completed by the above procedure of S801–S806. Thereafter, the process proceeds to S807.

In S807, a terminal device having the highest count among the counts stored in the first storage areas $461a$–$461e$ and a terminal device having the highest count among the counts stored in the second storage areas $462a$–$462e$ are identified by the second identification function. Thereafter, the process proceeds to S808.

In S808, the switching control values f for the terminal devices $2a$–$2e$ are obtained by the functional calculation function based on the priority numbers $A_p$ set in S805, the weights $\alpha$, $\beta$ and $\gamma$ set in S806, the counts $A_a$ obtained by the process of FIG. 6, the counts $A_t$ obtained by the process of FIG. 7, the counts $A_{amax}$ and $A_{tmax}$ of the terminal devices identified in S807, and the priority number $A_{pmax}$ of the terminal device having the highest priority. Specifically, each switching control value f is calculated by substituting the values $A_{amax}$, $A_{tmax}$, $A_{pmax}$, $\alpha$, $\beta$ and $\gamma$ and the values $A_a$, $A_t$ and $A_p$ of each terminal device into the function stored in the function storage area 456. Thereafter, the process proceeds to S809.

In S809, a terminal device having the highest volume (sound level) is identified by the first identification function based on the audio data received via the reception modems $401a$–$401e$. Thereafter, the process proceeds to S810.

In S810, whether or not the terminal device identified in S809 is identical with the terminal device of the participant being displayed by the terminal devices $2a$–$2e$ is determined. When identical (S810: YES), the process returns to S807 and the identification of terminal devices having the highest counts in the first storage areas $461a$–$461e$ and the second storage areas $462a$–$462e$ is carried out again. When not identical (S810: NO), the process proceeds to S811. The step S810, executed by the video switching determination function, is for determining whether or not to switch the video (video images) being displayed by the terminal device $2a$–$2e$.

In S811, the difference between the switching control value f of the terminal device identified in S809 and the switching control value f of the terminal device of the participant being displayed by the terminal devices $2a$–$2e$ is calculated by the difference calculation function. Thereafter, the process proceeds to S812.

In S812, the switching method extraction process is conducted and the process proceeds to S813. The details of the switching method extraction process will be described later.

In S813, the video switching process is conducted and the process proceeds to S814. The details of the video switching process will be described later.

In S814, whether the television conference has ended or not is judged. The television conference is ended by the conference coordinator by pressing a finish button of the controller 4. If the television conference has not ended yet (S814: NO), the process returns to S807 and the step by the second identification function is carried out again. If the television conference is judged to have ended (S814: YES), all the process is ended and the power of the television conference system 1 is shut off.

Next, the switching method extraction process shown in FIG. 8 will be described referring to FIG. 9.

The switching method extraction process is carried out by the switching method extraction function. First, in S901, whether or not the difference calculated in S811 is equal to the second threshold value or more is determined. When the difference is determined to be smaller than the second threshold value (S901: NO), the process proceeds to S902 and the fade-in/fade-out video switching program is extracted from the switching method storage area 458. When the difference is determined to be the second threshold value or more (S901: YES), the process proceeds to S903 and the instantaneous video switching program is extracted from the switching method storage area 458.

In this embodiment, the second threshold value is set to 0. Thus, the instantaneous video switching program is extracted if the difference is positive, while the fade-in/fade-out video switching program is extracted if the difference is negative. By setting the second threshold value to 0, the probability of the extraction of the instantaneous video switching program can be made equal to the probability of the extraction of the fade-in/fade-out video switching program.

Next, the video switching process shown in FIG. 8 will be described referring to FIG. 10.

The video switching process is carried out by the aforementioned video switching function (specifically, by the video extraction function, the video generation function and the video output function). First, in S1001, video images of the terminal device (participant) identified by the first identification function are extracted from the video storage area 451 by the video extraction function. Subsequently, the process proceeds to S1002 and new video images are generated by the video generation function from the video images being displayed by the terminal devices 2a–2e and the video images of the terminal device (participant) identified by the first identification function, according to the switching method extracted by the switching method extraction function. Subsequently, the process proceeds to S1003 and the new video images generated in S1002 are output to the terminal devices 2a–2e by the video output function.

In this embodiment, the video switching, considering the frequency of speech (remark, comment, response, etc.) and priority order of the participants, is realized by the above configuration.

<Usage of Television Conference System 1>

Next, the usage of the television conference system in this embodiment will be explained briefly. First, the conference coordinator connects the terminal devices 2a–2e with the controller 4 via the network 3. Before the start of the conference, the conference coordinator stores the first and second threshold values in the threshold storage area 452 of the RAM 413 by pressing the threshold setting buttons of the controller 4.

Subsequently, the conference coordinator presses the priority order setting buttons of the controller 4 and thereby sets the priority order (priority number) $A_p$ to each terminal device 2a–2e. In this embodiment, priority numbers $A_p$=5, 4, 3, 2 and 1 are assigned to the terminal devices 2a–2e starting from the terminal device of the highest priority. Subsequently, the conference coordinator assigns the weights to the three elements: the count $A_a$ stored in the first storage area (461a–461e), the count $A_t$ stored in the second storage area (462a–462e) and the priority order (priority number) $A_p$ stored in the priority order storage area 454 by pressing the weight setting buttons. For example, the coefficients α, β and γ representing the weights are set so that each coefficient will be 0 or more and the sum of them will be 1 (α=0.2, β=0.3, γ=0.5, for example). The conference coordinator assigns relatively heavier weights to elements that he/she considers important.

For example, when α is set to have a relatively large value, the count $A_a$ has higher effect on the switching control value f than the count $A_t$ or priority order $A_p$. That is, in such a case, the switching control value f for a terminal corresponding to a participant who has a relatively long total speech time has a large value. Therefore, the switching method extraction procedure is executed for the terminal more than the other terminals. As a result, the terminal may be selected more in comparison with terminals in which the count $A_t$ or priority order $A_p$ has a relatively large number.

After the preparation is completed by the above procedure, the television conference proceeds according to the flowcharts explained above. After the television conference is ended, the conference coordinator turns off the power of the television conference system 1.

<Modifications>

While the present invention has been described with reference to the above embodiment, it is not to be restricted by the particular illustrative embodiment. It is to be appreciated that a variety of improvement and modifications are possible without departing from the scope and spirit of the present invention.

For example, while the switching control value f is calculated in the above embodiment based on the count $A_a$ stored in the first storage area (461a–461e), the count $A_t$ stored in the second storage area (462a–462e) and the priority order $A_p$ stored in the priority order storage area (454a–454e) by the functional calculation function, the switching control value f may also be calculated based on other elements (factors). For example, the switching control value f may be obtained from the counts $A_a$ and $A_t$ only. In this case, the following function (2) is possible:

$$f = \alpha A_a/A_{amax} + \beta A_t/A_{tmax} \quad (2)$$

where α+β=1 (α, β≧0).

Further, while the switching method extraction function extracts the switching method based on the difference between the switching control value f of the terminal device (participant) being displayed by the terminal devices 2a–2e and the switching control value f of the terminal device (participant) identified by the first identification function, the switching method may also be extracted based only on the switching control value f of the terminal device identified by the first identification function, without calculating the difference. In this case, it is desirable that the second threshold value be set at 0.5. Since the switching control value f can take on values between 0 and 1, setting the second threshold value at 0.5 can equalize the probability of the extraction of the instantaneous video switching program by the switching method extraction function with the probability of the extraction of the fade-in/fade-out video switching program.

The switching method extraction function is not restricted to the extraction of the switching method based on a value obtained by calculating a function.

While the switching method storage area 458 in the above embodiment stores the fade-in fade-out video switching program and the instantaneous video switching program, the programs stored in the switching method storage area 458 are not limited to the programs. The video switching methods are not restricted to those having different switching timings, that is, the switching method storage area 458 may store, for example, the instantaneous video switching program and a program for maintaining the currently displayed video.

The present disclosure relates to the subject matter contained in Japanese Patent Application No. 2003-184323, filed on Jun. 27, 2003, which is expressly incorporated herein by reference in its entirety.

What is claimed is:

1. A television conference system enabling a plurality of participants to communicate with each other using terminal devices connected to a controller via information transfer system, wherein the controller comprises:

switching method storage system which stores a plurality of switching methods for switching video images displayed by the terminal devices;

first identification system which compares audio signals transmitted from the terminal devices and thereby identifies a terminal device having the audio signal of the highest sound level;

switching method extraction system which extracts one of the switching methods from the switching method storage system based on the frequency of speech of the participant using the terminal device identified by the first identification system; and video switching system which switches the video images displayed by the terminal devices into video images of the participant using the identified terminal device according to the switching method extracted by the switching method extraction system.

2. The television conference system according to claim 1, wherein the switching method storage system stores a plurality of switching methods that require different time lengths for the switching of the video images.

3. The television conference system according to claim 1, wherein:

the controller further comprises:
speech time measurement system having judgment system for judging whether the sound level of the audio signal transmitted from each terminal device exceeds a preset first threshold value or not at preset time intervals, which counts the number of frames as the preset time intervals in which the judgment system judged that the sound level exceeded the first threshold value and thereby converts speech time of each participant into a count; and count storage system which stores the count regarding each terminal device counted by the speech time measurement system, and the switching method extraction system extracts the switching method based on the counts stored in the count storage system.

4. The television conference system according to claim 3, wherein:

the speech time measurement system includes two or more measurement system whose count starting points are set differently, and the count storage system includes two or more storage system corresponding to the two or more measurement system for storing the counts taken by the measurement system.

5. The television conference system according to claim 4, wherein:

the controller further comprises weight setting system which sets weights to the counts stored in each storage system, and the switching method extraction system extracts the switching method based on the counts stored in each storage system and the weights set by the weight setting system.

6. The television conference system according to claim 5, wherein:

the weight setting system sets coefficients as the weights, and the controller further comprises functional calculation system which calculates a switching control value f for each terminal device according to a function which is expressed by the counts stored in the storage system and the coefficients, and the switching method extraction system extracts the switching method based on the switching control values f calculated by the functional calculation system.

7. The television conference system according to claim 6, wherein:

the speech time measurement system includes:
first measurement system which counts total speech time from the start of the conference; and second measurement system which counts speech time from the latest speech start point, and the count storage system includes:
first storage system which stores each count ($A_a$) taken by the first measurement system for each terminal device; and second storage system which stores each count ($A_t$) taken by the second measurement system for each terminal device, and the controller further comprises second identification system which identifies a terminal device having the highest count stored in the first storage system and a terminal device having the highest count stored in the second storage system, and the function is expressed as:

$$f = \alpha A_a/A_{amax} + \beta A_t/A_{tmax}$$

where $\alpha + \beta = 1$ ($\alpha, \beta \geq 0$), and $\alpha$ and $\beta$ are the coefficients set by the weight setting system, and $A_{amax}$ denotes the count of the terminal device having the highest count stored in the first storage system identified by the second identification system, and $A_{tmax}$ denotes the count of the terminal device having the highest count stored in the second storage system identified by the second identification system.

8. The television conference system according to claim 6, wherein:

the controller further comprises difference calculation system which calculates the difference between the switching control value f of the terminal device identified by the first identification system and the switching control value f of the terminal device used by the participant currently displayed, and the switching method extraction system extracts the switching method based on the difference calculated by the difference calculation system.

9. The television conference system according to claim 8, wherein:

the switching method storage system stores a fade-in fade-out video switching program and an instantaneous video switching program as the video switching methods, and the switching method extraction system extracts the instantaneous video switching program when the difference calculated by the difference calculation system is a preset second threshold value or more, and the switching method extraction system extracts the fade-in fade-out video switching program when the difference calculated by the difference calculation system is less than the second threshold value.

10. The television conference system according to claim 3, wherein:

the controller further comprises priority order setting system which sets priority order to the participants using the terminal devices, and the switching method extraction system extracts the switching method based on the counts taken by the speech time measurement system and the priority order set by the priority order setting system.

11. The television conference system according to claim 10, wherein:

the controller further comprises weight setting system which sets weights to the counts taken by the speech time measurement system and the priority order set by the priority order setting system, and the switching method extraction system extracts the switching method based on the counts stored in the count storage system, the priority order set by the priority order setting system and the weights set by the weight setting system.

12. The television conference system according to claim 11, wherein:
the speech time measurement system includes two or more measurement system whose count starting points are set differently, and
the count storage system includes two or more storage system corresponding to the two or more measurement system for storing the counts taken by the measurement system, and
the weight setting system sets the weights to the counts stored in each storage system and the priority order set by the priority order setting system, and
the switching method extraction system extracts the switching method based on the counts stored in each storage system, the priority order set by the priority order setting system and the weights set by the weight setting system.

13. The television conference system according to claim 12, wherein:
the weight setting system sets coefficients as the weights, and
the controller further comprises functional calculation system which calculates a switching control value f for each terminal device according to a function expressed by the count(s), the priority order and the coefficients, and
the switching method extraction system extracts the switching method based on the switching control values f calculated by the functional calculation system.

14. The television conference system according to claim 13, wherein:
the speech time measurement system includes:
first measurement system which counts total speech time from the start of the conference; and
second measurement system which counts speech time from the latest speech start point, and
the count storage system includes:
first storage system which stores each count ($A_a$) taken by the first measurement system for each terminal device; and
second storage system which stores each count ($A_t$) taken by the second measurement system for each terminal device, and
the priority order set by the priority order setting system is expressed in terms of priority numbers ($A_p$) that get larger as the priority gets higher, and
the controller further comprises second identification system which identifies a terminal device having the highest count stored in the first storage system and a terminal device having the highest count stored in the second storage system, and
the function is expressed as:

$$f = \alpha A_a/A_{amax} + \beta A_t/A_{tmax} + \gamma A_p/A_{pmax}$$

where $\alpha+\beta+\gamma=1$ ($\alpha, \beta, \gamma \geq 0$), and
$\alpha, \beta$ and $\gamma$ are the coefficients set by the weight setting system, and
$A_{amax}$ denotes the count of the terminal device having the highest count stored in the first storage system identified by the second identification system, and
$A_{tmax}$ denotes the count of the terminal device having the highest count stored in the second storage system identified by the second identification system, and
$A_{pmax}$ denotes the priority number of a terminal device having the highest priority.

15. The television conference system according to claim 13, wherein:
the controller further comprises difference calculation system which calculates the difference between the switching control value f of the terminal device identified by the first identification system and the switching control value f of the terminal device used by the participant currently displayed, and
the switching method extraction system extracts the switching method based on the difference calculated by the difference calculation system.

16. The television conference system according to claim 15, wherein:
the switching method storage system stores a fade-in fade-out video switching program and an instantaneous video switching program as the video switching methods, and
the switching method extraction system extracts the instantaneous video switching program when the difference calculated by the difference calculation system is a preset second threshold value or more, and
the switching method extraction system extracts the fade-in fade-out video switching program when the difference calculated by the difference calculation system is less than the second threshold value.

17. A television conference system enabling a plurality of participants to communicate with each other using terminal devices connected to a controller via information transfer system, each of the terminal devices being provided with a display for displaying a participant making a remark, comprising:
a speech quantity information obtaining system that obtains speech quantity information related to quantity of speech of each of the plurality of participants during a conference;
a terminal identifying system that identifies a terminal corresponding to a participant currently making a remark; and
an image switching system that switches images displayed on the displays of the plurality of terminal devices from a previous participant to the participant currently making a remark by one of a plurality of different switching methods which is determined in accordance with the speech quantity information of the participant currently making a remark.

18. The television conference system according to claim 17, wherein the speech quantity information includes a plurality of types of information related to quantities of speech measured in a plurality of different measuring methods, respectively.

19. The television conference system according to claim 18, wherein the plurality of types of information are weighted.

20. The television conference system according to claim 18, wherein the speech quantity information includes information related to speech time of each participant per single remark.

21. The television conference system according to claim 18, wherein the speech quantity information includes information related to accumulated speech time of each participant from the beginning of the conference.

22. The television conference system according to claim 17, wherein the plurality of terminal devices are assigned with a plurality of predetermined parameter values, respectively, the image switching system switching the images by a method that is determined in accordance with the speech quantity information of the participant currently making a remark and the parameter value assigned to the terminal device corresponding to the participant currently making a remark.

23. The television conference system according to claim 22, wherein the plurality of types of information and the parameter value are weighted.

24. The television conference system according to claim 22, wherein the predetermined parameter values include values representing priority.

25. The television conference system according to claim 17, wherein the image switching system determines one of the plurality of switching methods in accordance with the speech quantity information of the participant currently making a remark and the speech quantity information of the participant previously displayed on the displays of the terminal devices.

26. The television conference system according to claim 17, wherein the plurality of different switching methods have at least different transition time periods which are necessary for switching displayed images.

27. A method for switching images employed in a television conference system that enables a plurality of participants to communicate with each other using terminal devices connected to a controller via information transfer system, each of the terminal devices being provided with a display for displaying a participant making a remark, the method comprising the steps of:

obtaining speech quantity information related to quantity of speech of each of the plurality of participants during a conference;

identifying a terminal corresponding to a participant currently making a remark; and switching images displayed on the displays of the plurality of terminal devices from a previous participant to the participant currently making a remark by one of a plurality of different switching methods which is determined in accordance with the speech quantity information of the participant currently making a remark.

28. The method according to claim 27, wherein the speech quantity information includes a plurality of types of information related to quantities of speech measured in a plurality of different measuring methods, respectively.

29. The method according to claim 28, wherein the plurality of types of information are weighted.

30. The method according to claim 28, wherein the speech quantity information includes information related to speech time of each participant per single remark.

31. The method according to claim 28, wherein the speech quantity information includes information related to accumulated speech time of each participant from the beginning of the conference.

32. The method according to claim 27, wherein the plurality of terminal devices are assigned with a plurality of predetermined parameter values, respectively, the switching step switching the images by a method that is determined in accordance with the speech quantity information of the participant currently making a remark and the parameter value assigned to the terminal device corresponding to the participant currently making a remark.

33. The method according to claim 32, wherein the plurality of types of information and the parameter value are weighted.

34. The method according to claim 32, wherein the predetermined parameter values include values representing priority.

35. The method according to claim 27, wherein the switching step determines one of the plurality of switching methods in accordance with the speech quantity information of the participant currently making a remark and the speech quantity information of the participant previously displayed on the displays of the terminal devices.

36. The method according to claim 27, wherein the plurality of different switching methods have at least different transition time periods which are necessary for switching displayed images.

* * * * *